United States Patent [19]

Hayashi et al.

[11] Patent Number: 4,631,834
[45] Date of Patent: Dec. 30, 1986

[54] COORDINATE MEASURING INSTRUMENT

[75] Inventors: Koji Hayashi; Susumu Yoshioka; Noritsugu Ono, all of Utsunomiya, Japan

[73] Assignee: Mitutuoyo Mfg. Co., Ltd., Tokyo, Japan

[21] Appl. No.: 776,056

[22] PCT Filed: Apr. 19, 1985

[86] PCT No.: PCT/JP85/00218
§ 371 Date: Aug. 29, 1985
§ 102(e) Date: Aug. 29, 1985

[87] PCT Pub. No.: WO85/04950
PCT Pub. Date: Nov. 7, 1985

[30] Foreign Application Priority Data

Apr. 20, 1984 [JP] Japan .................................. 59-79754
Apr. 20, 1984 [JP] Japan .................................. 59-79758

[51] Int. Cl.⁴ .............................................. G01B 7/28
[52] U.S. Cl. ..................................... 33/503; 33/1 M; 33/505
[58] Field of Search ................ 33/503, 504, 505, 1 M, 33/551, 552, 557

[56] References Cited

U.S. PATENT DOCUMENTS

| 3,164,909 | 1/1965 | Rosenberg | 33/505 |
| 3,750,295 | 8/1973 | Nordmann et al. | 33/503 |
| 4,442,607 | 4/1984 | Sakata et al. | 33/503 |
| 4,489,333 | 12/1984 | Anderka et al. | 33/503 |
| 4,507,868 | 4/1985 | Tuss | 33/503 |
| 4,567,659 | 2/1986 | Kitamura | 33/503 |

Primary Examiner—Willis Little
Attorney, Agent, or Firm—Flynn, Thiel, Boutell & Tanis

[57] ABSTRACT

A coordinate measuring instrument including: a table (50) movable in the direction of Y-axis on a bedplate (10); a slider (110) movable in the direction of X-axis through supports (90) and a beam member (100); a Z-axis structure (180) supported by this slider (110) in a manner to be movable in the direction of Z-axis; a probe stocker (290) fixed to the table (50) and capable of resting thereon a plurality of probe holders (250) each having a signal producing probe (280); and a probe mounting-removing mechanism (200) provided in the Z-axis structure (180), the probe mounting-removing mechanism (200) being capable of selectively installing a signal producing probe (250) most suitable for the shape of a work (320) to be measured.

18 Claims, 24 Drawing Figures

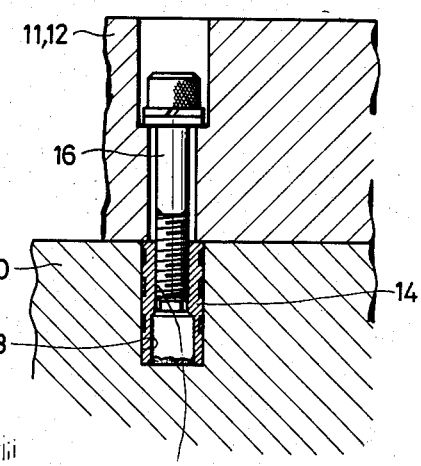
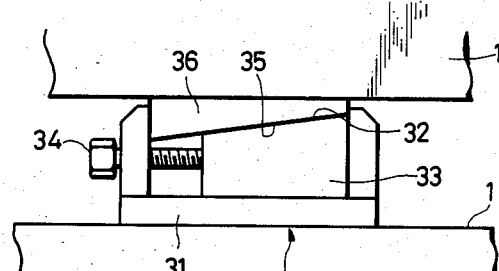
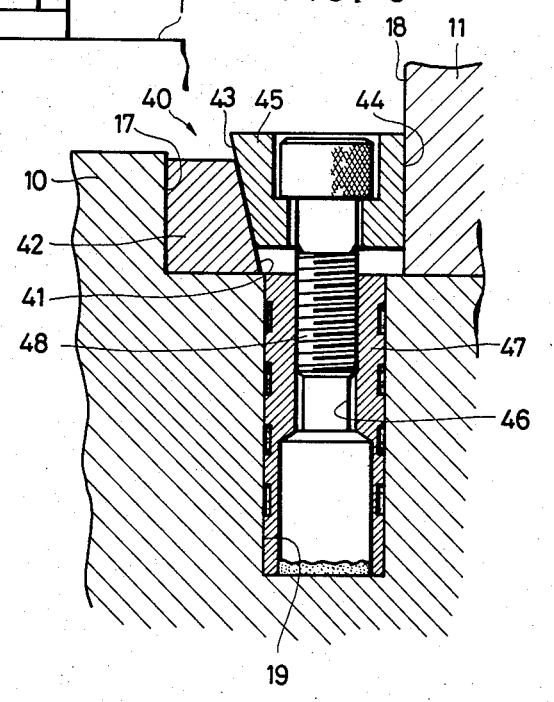

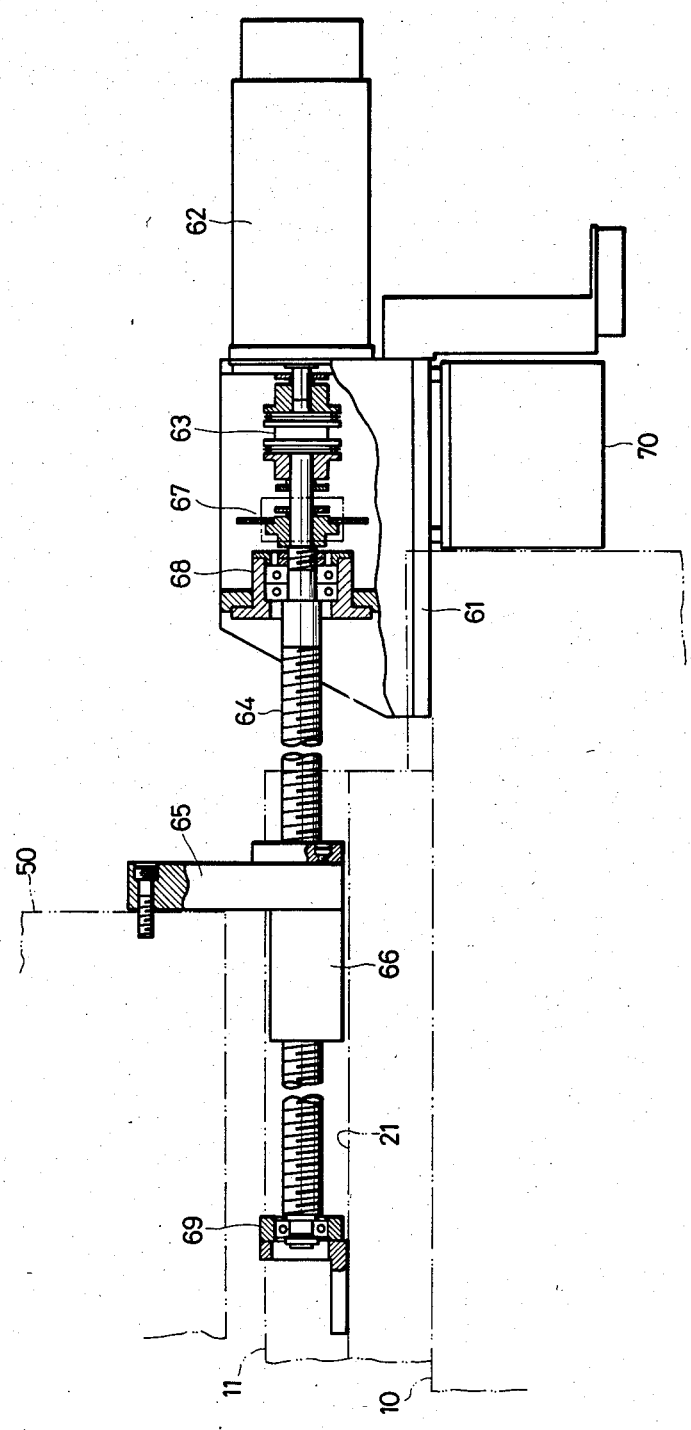

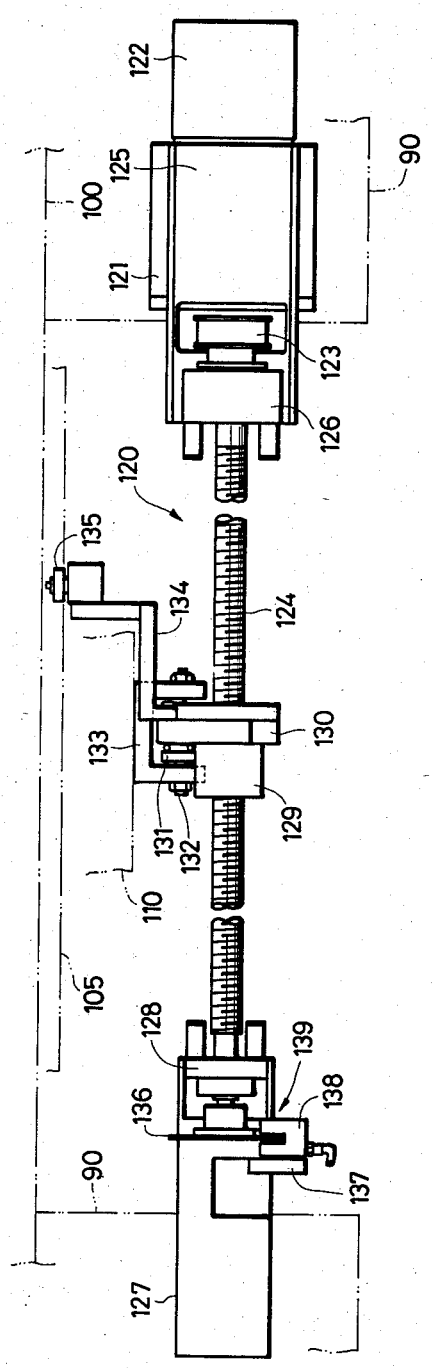

COORDINATE MEASURING INSTRUMENT

TECHNICAL FIELD

This invention relates to a coordinate measuring instrument, and more particularly to an automatic probe mounting-removing device wherein a signal producing probe is automatically mountable and removable.

BACKGROUND TECHNIQUES

There has heretofore been known a coordinate measuring instrument wherein a signal producing probe such as a touch signal probe to produce a signal directly or an approach signal probe to produce a predetermined approach signal indirectly is tridimensionally moved to measure a configuration of a work to be measured. In general, the coordinate measuring instrument of the type described is of such an arrangement that supports are provided on a bedplate in a manner to be movable in the longitudinal direction, i.e. a direction of Y-axis, a slider laterally racked across the top ends of these supports in a manner to be movable in the lateral direction, i.e. a direction of X-axis, and a Z spindle is provided in a manner to be movable in the vertical direction, i.e. a direction of Z-axis. Herein, a stacking construction is adopted that the supports are assembled onto the bedplate, the slider onto the supports and the Z spindle onto the slider, successively.

In consequence, unless rigid structures are successively adopted from the bedplate to the Z spindle, it is difficult to secure the accuracy. This causes such disadvantages in a so-called automatic coordinate measuring instrument, wherein the respective axes are of automatically driven type, that a driving source is raised to a high horsepower one due to a high weight load, a control system is made to be a high class one due to a high inertia, or feed at high speed becomes difficult to do. Furthermore, the general construction is large-sized, which leads to an economical disadvantage.

Furthermore, in the coordinate measuring instrument, replacement of the touch signal probes is performed mainly, the means for mounting and removing is screwing or the like, which is not automatic and requires labor hours. Further, such touch signal probes, which should be replaced one with another in accordance with the use applications, must be prepared each time, and an angle of a measuring element of the touch signal probe, which has been mounted, should be varied in accordance with the configuration of the work. In any case, the operation relating to the touch signal probe disadvantageously requires labor hours.

The present invention has as its object the provision of a coordinate measuring instrument capable of improving the operating efficiency in carrying out an operation of mounting or removing a touch signal probe, an operation of changing a direction of a measuring element and the like in the coordinate measuring instrument.

DISCLOSURE OF THE INVENTION

To achieve the above-described object, the present invention contemplates that: a table is made movable relative to a bedplate; a probe mounting-removing mechanism capable of automatically mounting or removing a signal producing probe is provided in a Z-axis structure so as to achieve the practical results of automating; a probe stocker is provided on said movable table; and a probe holder having a signal producing probe is rested on said probe stocker; whereby: a feed construction is made compact in size as the result of making movable sections to be compact in size; and a driving mechanism such as a table required for moving the work is utilized for mounting and removing the probe, to thereby dispense with a special machine, control circuit or the like for the feed in said probe mounting-removing mechanism.

BRIEF DESCRIPTION OF THE DRAWINGS

FIGS. 3 to 5 are enlarged views showing the essential portions of FIG. 2;

FIG. 6 is an enlarged sectional view showing a Y-axis direction driving mechanism;

FIGS. 7 and 8 are an enlarged plan view and a partially sectional, enlarged front view showing an X-axis direction driving mechanism;

THE MOST PREFERRED FORM FOR WORKING THE INVENTION

Description will hereunder be given of the embodiments of the present invention with reference to the drawings.

Figure 1:
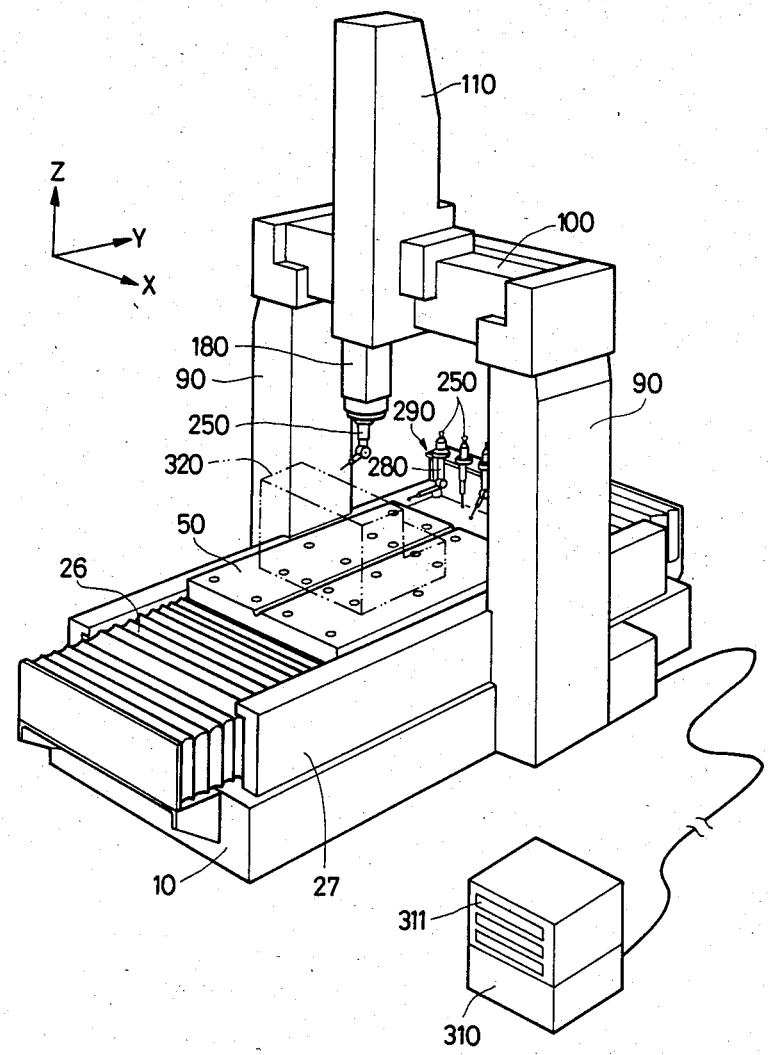
FIG. 1 is a perspective view showing the general arrangement of one embodiment of the present invention.
Figure 2:
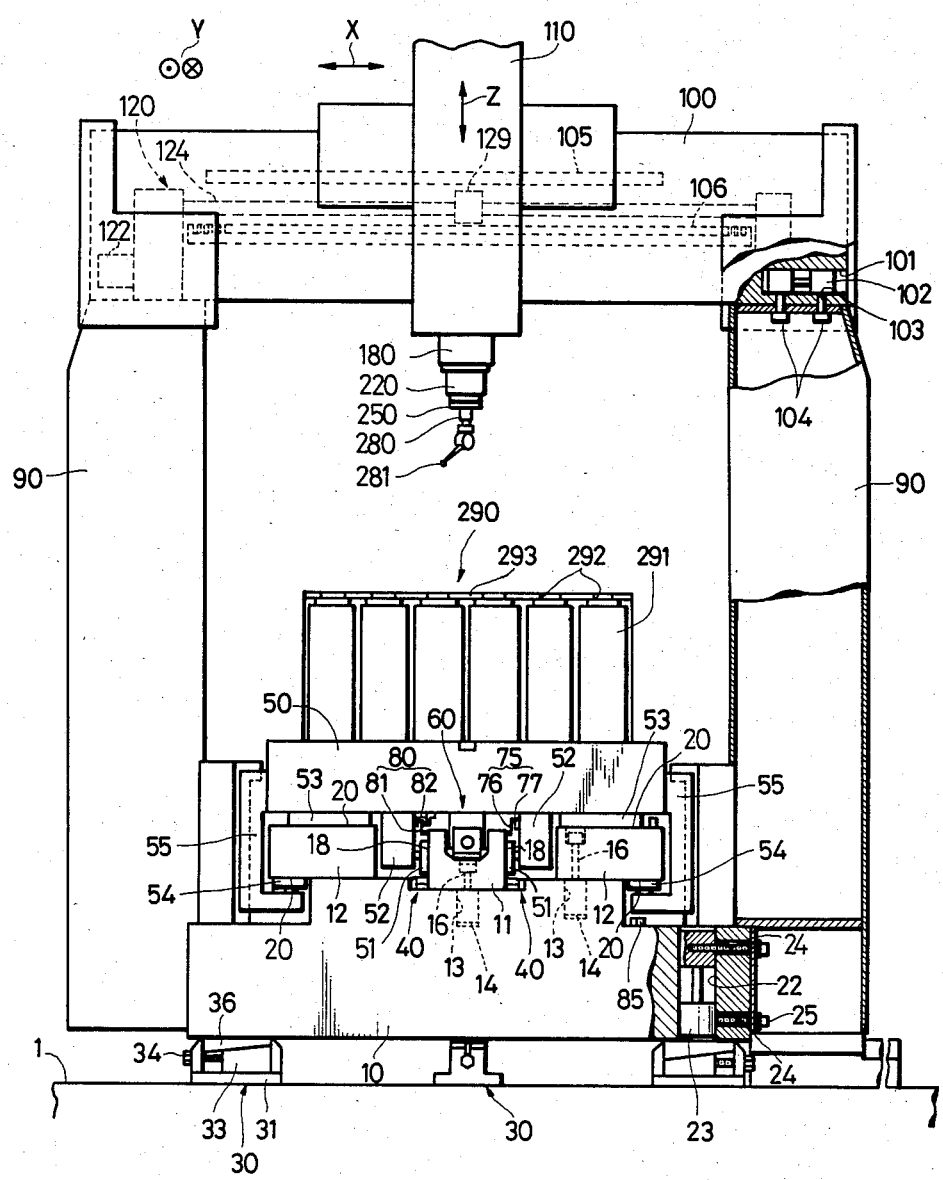
FIG. 2 is a partially cutaway front view of FIG. 1.

In FIGS. 1 and 2 showing the general arrangement, a bedplate 10 formed of a stone-like member such as a natural stone or ceramics is horizontally mounted on an installation floor 1 through a plurality of horizontal centering jigs 30. This bedplate 10 is generally formed into a form having a protruded central portion. A first guide member 11 formed of a stone-like member similar to the bedplate 10 and forming a guide surface in the direction of Y-axis is screwed to the center of the top surface of the bedplate 10 with the protruded central portion. Further, a pair of second guide members 12 being flat and formed of stone-like members are screwed to opposite sides of this first guide member 11 in symmetry and in a manner to be partially protruded from the top face of the protruded central portion of the bedplate 10. In this case, as shown in FIG. 3, the first guide member 11 or one of the second guide members 12 is fixed to the bedplate 10 such that a bolt 16 penetrating through the first guide member 11 or the second guide member 12 is threadably coupled into a threaded hole 15 formed in a fixture 14 bonded and fixed into a blind hole 13 provided in the bedplate 10. Furthermore, in this description, the direction of X-axis means the direction from the right to the left in FIG. 2, the direction of Y-axis means the direction perpendicularly intersecting the paper surface in FIG. 2, and the direction of Z-axis means the direction from the top to the bottom, i.e. the vertical direction in FIG. 2. In consequence, these X-, Y- and Z-axes are three axes including X- and Y-axes being incorporated in the horizontal plane and Z-axis being vertical to the horizontal plane, all of these three axes being perpendicular to one another.

As shown in FIG. 4, each of the horizontal centering jigs 30 includes: a base 31 formed into a generally U-shape in profile; a slidable piece 33 received in this base 31 and formed at the top face thereof with an inclined surface 32; a bolt 34 screwed into a rising portion of the base 31 in a manner to be linearly movable and causing the slidable piece 33 to move along the bottom face of the base 31; and an abutting piece 36 received within side walls provided at opposite sides of the base 31 in a manner to be slidable in the vertical direction, having an inclined surface 35 engageable with the inclined surface 32 of the slidable piece 33 and abutted against the undersurface of the bedplate 10; whereby rotation of the bolt 34 makes it possible to adjust the position of the bedplate 10 in height relative to the installation floor 1 through the agency of the inclined surfaces 32 and 35, so that the bedplate 10 can be horizontally centered.

At positions on the opposite sides of the first guide member 11, there are arranged a plurality of, for example three pairs or more, practically about 16 or 32 pairs, straightening means 40, to thereby obtain the straightness of the first guide member 11. As shown in FIG. 5, each of these straightening means 40 includes: a stationary piece 42 bonded and fixed to a side surface of a groove 17 formed on the top surface of the bedplate 10 and having an inclined surface 41 on the side opposite to the fixed surface thereof; a movable piece 45 having an inclined surface 43 engageable with the inclined surface 41 of the stationary piece 42 and a vertical surface 44 abutted against a parallel guide surface 18 for regulating the movement of the first guide member 11 in the direction of X-axis on the side opposite to the inclined surface 43; a fixture 47 bonded and fixed into a blind hole 19 formed in the bedplate 10 and provided at the central portion thereof with a threaded hole 46; and a bolt 48 penetrating through the movable piece 45 and threadably coupled into a threaded hole 46 formed in the fixture 47; whereby the threaded-in value of the bolt 48 is adjusted to vary a position of engagement between the inclined surfaces 41 and 43, so that the parallel guide surface 18 can be pushed by the vertical surface 44 to straighten the straightness of the first guide member 11.

A metallic table 50 is provided on the bedplate 10 in a manner to be movable in the direction of Y-axis. Air bearings 51 opposed to the parallel guide surface 18 of the first guide member 11 are secured to the undersurface of this table 50 through brackets 52, relatively large air bearings 53 opposed to the upper guide surfaces 20 out of the upper and the lower parallel guide surfaces 20 for regulating the movements of the second guide members 12 in the direction of Z-axis are provided, further, air bearings 54 opposed to the lower guide surfaces 20 out of the parallel guide surfaces 20 are secured to the table 50 through brackets 55, the table 50 can move on the bedplate 10 under a weak force through the agency of the respective air bearings 51, 53 and 54, regulated in movement in the direction of X-axis through the agency of the first guide member 11 and the air bearings 51, regulated in movement in the direction of Z-axis through the agency of the second guide member 12 and the bearings 53 and 54, and can move straightly in the direction of Y-axis.

Furthermore, a Y-axis direction driving mechanism 60 for driving the table 50 in the direction of Y-axis is provided between the bedplate 10 and the table 50. As shown in FIG. 6, the Y-axis direction driving mechanism 60 includes: a motor 62 fixed to the bedplate 10 through a bracket 61; a feed screw shaft 64 connected to an output shaft of the motor 62 through a coupling 63; a nut member 66 movably, threadably coupled to the feed screw shaft 64 and fixed to the table 50 through a bracket 65; a solenoid brake 67 including a rotary disc secured to the feed screw shaft 64 and a braking section to stop the disc in rotation, for stopping the feed screw shaft 64 in rotation; a bearing 68 provided on the bracket 61 and supporting one end portion of the feed screw shaft 64; a bearing 69 fixed into a groove 21 formed in the first guide member 11 and supporting the other end portion of the feed screw shaft 64; and an electronic circuit section 70 provided on the undersurface of the bracket 61, for delivering predetermined electric signal to the motor 62 and the like.

As shown in FIG. 2, the feed value of the table 50 driven by the motor 62 is measured by Y-axis direction movement value measuring means 75 including a scale 76 provided on the first guide member 11 and a detecting section 77 provided on the bracket 52 of a table 50, and a zero position for measuring an origin position of the table 50, i.e. and absolute position is set by zero set means 80 including a zero mark 81 provided on the first guide member 11 and a detection switch 82 provided on the table 50. Further, the scope of movement of the table 50 is regulated by a dog 85 disposed on the bedplate 10 and limit switches on the table 50, not shown.

Referring to FIG. 2, supports 90 are fixed to opposite side surfaces of the bedplate 10, respectively. These supports 90 are fixed to the bedplate 10 by bolts 25 penetrating through through-holes 24 and threadably coupled into fastening fixtures 23 being of generally double-headed pounders inserted into holes 22 formed at a plurality of positions on the opposite side surfaces of the bedplate 10, respectively, in the direction of Y-axis. These supports 90 are made of a metal such as iron, and a beam 100 formed of a material similar to the bedplate 10 as being a structure of non-movable member is laterally racked across the top ends of these supports 90 and fixed thereto. This beam 100 is fixed to the supports 90 such that, similarly to the case of fixing the supports 90 to the bedplate 10, the fixing construction includes: holes 101 formed in the beam 100 made of a material such as a natural stone, fastening fixtures 102 being of generally double-headed pounders 102 and bolts 104 penetrating through through-holes 103 and threadably coupled into threaded holes of the fastening fixtures 102.

A slider 110 is supported on the beam 100 in a manner to be movable in the direction of X-axis and, behind the beam 100, there are provided a guide rail 105 for guiding the slider 110 in the direction of X-axis and a scale 106 for detecting a movement value of the slider 100.

Figure 8:
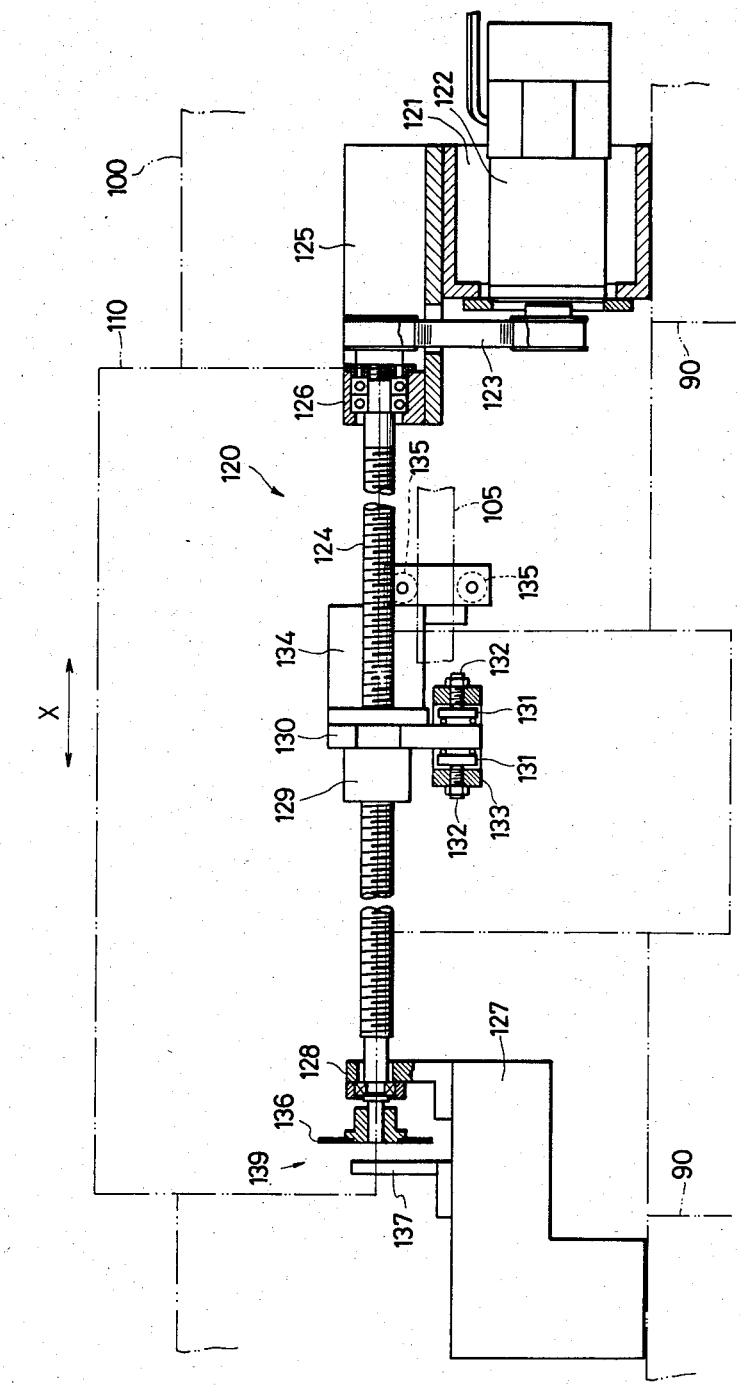

As shown in FIGS. 7 and 8, in the rear of the beam 100, there is provided an X-axis direction driving mechanism 120 for driving the slider 110 in the direction of X-axis. This X-axis direction driving mechanism 120 includes: a motor 122 supported on one of the supports 90 through a bracket 121; a feed screw shaft 124 rotatably driven by the motor 122 through a timing belt 123; a bearing 126 rotatably supporting one end portion of the feed screw shaft 124 and secured to the bracket 121 through an upper bracket 125; a bearing 128 rotatably supporting the other end portion of the feed screw shaft 124 and secured onto the other of the supports 90 through a bracket 127; a nut member 129 threadably coupled onto the feed screw shaft 124 in a manner to be axially movable; a connecting plate 130 fixed to this nut member 129; a bracket 133 being of an inverted U-shape in plan view and fixed to the slider 110, supporting opposite surfaces of a protruding portion of this connecting plate 130 in such a manner that the connecting plate 130 is unmovable in the axial direction of the feed screw shaft 124 and movable in the radial direction thereof through a thrust bearing 131 and a set-screw 132 formed at the forward end thereof with a spherical portion; a connecter 134 fixed at one end portion thereof to the connecting plate 130 and being of a crank-shape in plan view; a pair of rollers 135 rotatably secured to the other end portion of this connector 134, abutted against the guide rail 105 provided behind the beam 100 in a manner to clamp the guide rail 105, permitting the movement of the nut member 129 in the axial direction of the feed screw shaft 124 under low friction and locking the rotation of the nut member 129; a solenoid brake 139 including a rotary disc 136 secured to the forward end of the other end portion of the feed screw shaft 124 and a braking section 138 secured to the bracket 127 through a bracket 137, for stopping the rotary disc 136 in rotation by an electromagnetic force; whereby rotation of the motor 122 drives the slider 110 in the direction of X-axis, so that a movement value of this slider 110 can be measured by the scale 106 and a sensor 118 (Refer to FIG. 9) of an optical type or the like provided on the slider 110 in opposed relationship to this scale 106. Furthermore, the rotation-locking of the nut member 129 is not effected by the slider 110, but, the nut member 129 is supported by the beam 100 as being a structure on the side of the unmovable member, whereby the force in the rotating direction applied to the slider 110 is removed, so that the measuring accuracy of the measuring element portion supported by the slider 110 is not affected. Further, the thrust bearing 131, the set-screw 132 and the bracket 133 constitute connecting means.

Figure 9:
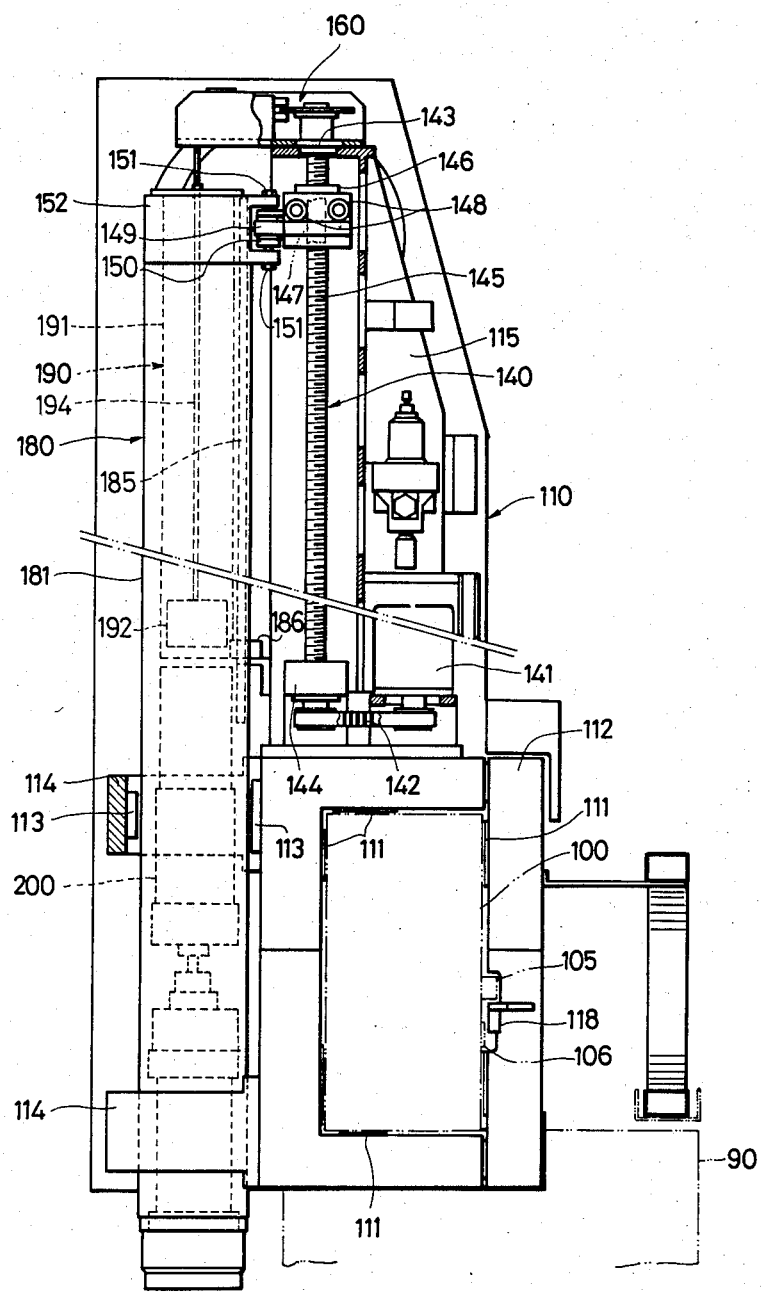
FIG. 9 is an enlarged sectional view partially sectionally showing the slider.

As shown in FIG. 9, the slider 110 includes: an X-axis direction guide bearing box 112 provided for surrounding the beam 100 and having air bearings 111 each facing each surface of the square-shaped beam 100; a pair of upper and lower Z-axis direction guide bearing boxes 114 mounted to the front surface of this X-axis direction guide bearing box 112 and incorporating therein air bearings 113 arranged in a square shape in plan view; a Z-axis structure 180 inserted through these Z-axis direction guide bearing boxes 114 in a manner to be movable in the direction of Z-axis; a Z-axis direction driving mechanism 140 supported on a support frame 115 erected on the X-axis direction guide bearing box 112; and a lock device 160 provided on the top end portion of the support frame 115, for preventing the Z-axis direction driving mechanism 140 from freely rotating to thereby preclude the Z-axis structure 180 from falling off.

The Z-axis direction driving mechanism 140 includes: a motor 141 supported on the support frame 115; a feed screw shaft 145 having a relatively large thread pitch such for example as 4 mm or more, being rotated through a timing belt 142 by this motor 141 and rotatably supported at the upper and lower end portions thereof by bearings 143 and 144, which are provided at the upper and lower portions of the support frame 115; a nut member 146 axially movably supported by this feed screw shaft 145; a pair of rollers 148 rotatably supported by this nut member 146, abutted against opposite walls of a guide rail 147 secured to a wall surface, not shown, on this side of the support frame 115 in FIG. 9 in a manner to clamp the opposite walls of the guide rail 147, and guiding the nut member 146 in a manner to be easily movable in the direction of Z-axis, but, non-rotatable; a connecting plate 149 fixed to the nut member 146; a bracket 152 connected to the top and bottom faces of the protruding ends of this connecting plate 149 through thrust bearing 150 and set-screws 151 each having a spherical portion at the forward end thereof and fixed to the top end portion of the Z-axis structure 180; whereby the Z-axis structure 180 can be driven through the bracket 152 in the direction of Z-axis. In this case, the influence due to the sweep, eccentricity and the like of the feed screw shaft 145 is absorbed by the portion of the thrust bearing 150 made unmovable in the axial direction and movable in the radial direction of the feed screw shaft 145 relative to the connecting plate 149.

Figure 10:
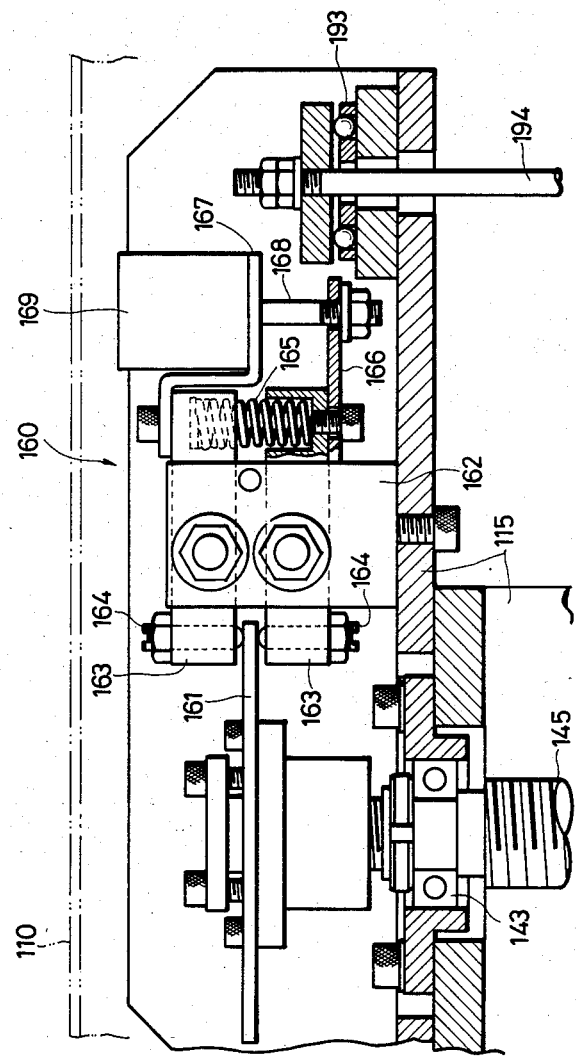
FIG. 10 is an enlarged sectional view showing a lock device.

As shown in FIG. 10, the lock device 160 includes: a disc 161 fixed to the top end portion of the feed screw shaft 145; a pair of rocking members 163 spaced a predetermined distance apart from each other, rockingly supported at central portions thereof by a bracket 162 fixed to the top end portion of the support frame 115 and opposed at end portions thereof on one side to the disc 161; bolts 164 threadably coupled to the end portions of the rocking members 163 at one side and formed with spherical portions at the forward end portions thereof opposed to the disc 161; a spring 165 confined between ends of the rocking members 163 on the other side, for biasing the bolts 164 to constantly press the same against the top and bottom faces of the disc 161; an elongate member 166 fixed to the other end of one of the pair of rocking members 163; and an air cylinder 169 secured through a bracket 167 to the other end of the other of the pair of rocking members 163 and engaged at the forward end portion of a piston rod 168 thereof with the elongate member 166. When compressed air is supplied to this air cylinder 169 to retract the piston rod 168, the pair of rocking members 163 are operated against the resiliency of the spring 165 such that the end portions of the rocking members 163 on one side, to which the bolts 164 are mounted, are opened, whereby the disc 161 is permitted to rotate freely. On the other hand, supply of compressed air to the air cylinder 169 is cut off, the pair of rocking members 163 are operated in a direction opposite to the above through the resiliency of the spring 165 to clamp the disc 161 between the forward end of the bolts 164, whereby the feed screw shaft 145 is prevented from rotating feely, so that the nut member 146 threadably coupled to the feed screw shaft 145 is precluded from moving, thus enabling to prevent the Z-axis structure 180 connected through the connecting plate 149, the bracket 152 and the like to this nut member 146 from falling off by garavity.

As shown in FIG. 9, this Z-axis structure 180 is provided with a casing 181 formed of a tube being of a square shape in cross section, which in turn is provided therein with an air balance mechanism 190 and a probe mounting-removing mechanism 200. Furthermore, a scale 185 is fixed to rear surface of the casing 181 in the drawing and the support frame 115 is provided with a detector 186 for reading the graduation of the scale 185, so that a movement value of the Z-axis structure 180 in the direction of Z-axis can be detected by the scale 185 and the detector 186.

Figure 11:
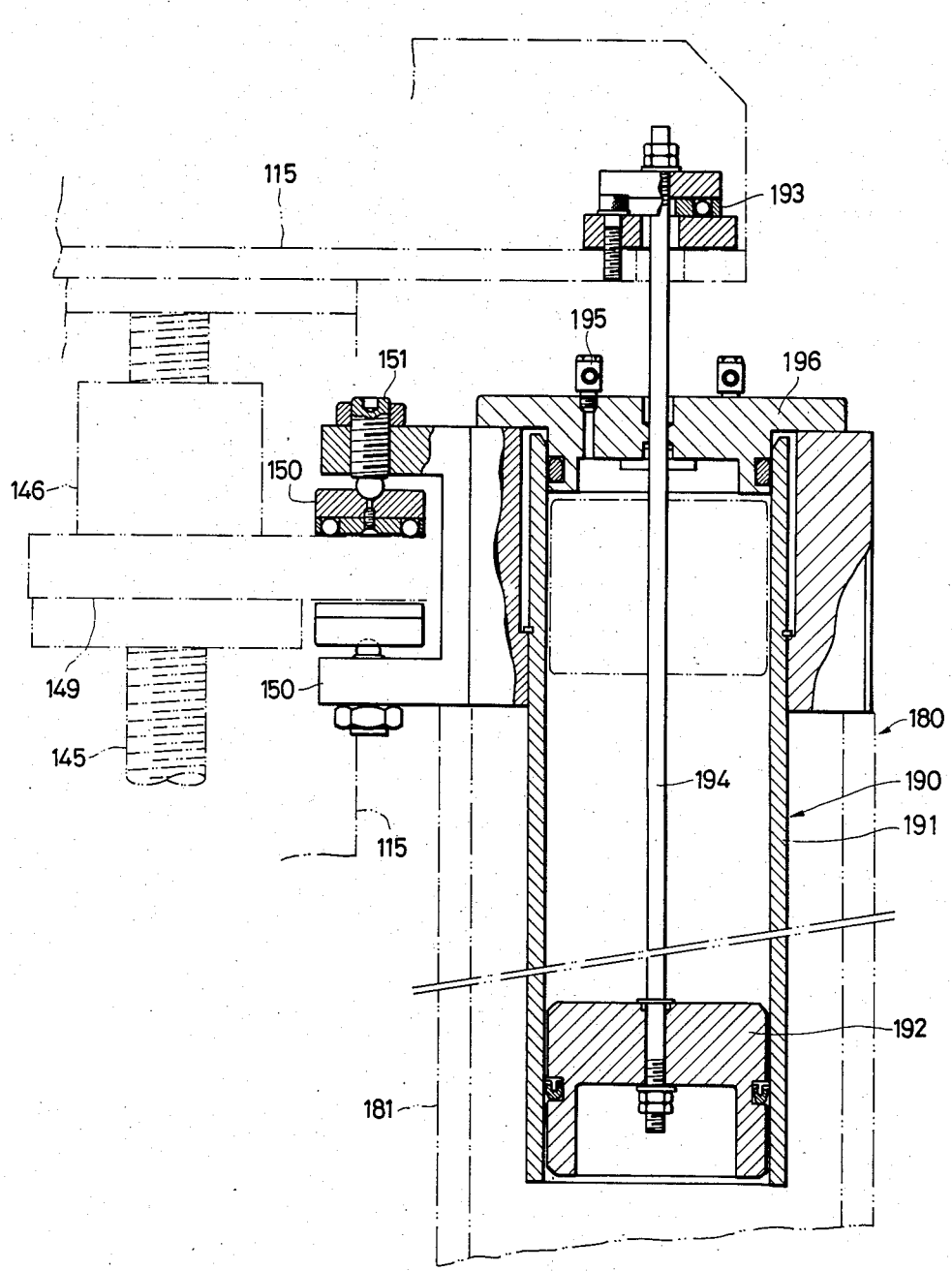
FIG. 11 is an enlarged sectional view showing an air balance mechanism.

As shown in FIG. 11, the air balance mechanism 190 includes: a cylinder 191 opened downwardly at the bottom end; a piston 192 slidably received in this cylinder 191; a piston rod 194 connected at one end thereof to this piston 192 projected at the other end, i.e. the top end thereof through the cylinder 191, and rotatably supported by the top end portion of the support frame 115 through a thrust bearing 193; and a top plate 196 blocking the top end portion of the cylinder 191 and having a pipe joint 195 capable of communicating the interior of the cylinder 191 with a compressed air source or atmosphere through a solenoid valve, not shown. With this arrangement, air stored in the cylinder 191 of the air balance mechanism 190 functions as a cushion material to be balanced with the gravity of the Z-axis structure 180, so that the Z-axis structure 180 can be driven in the direction of Z-axis by use of a very small force.

Figure 12:
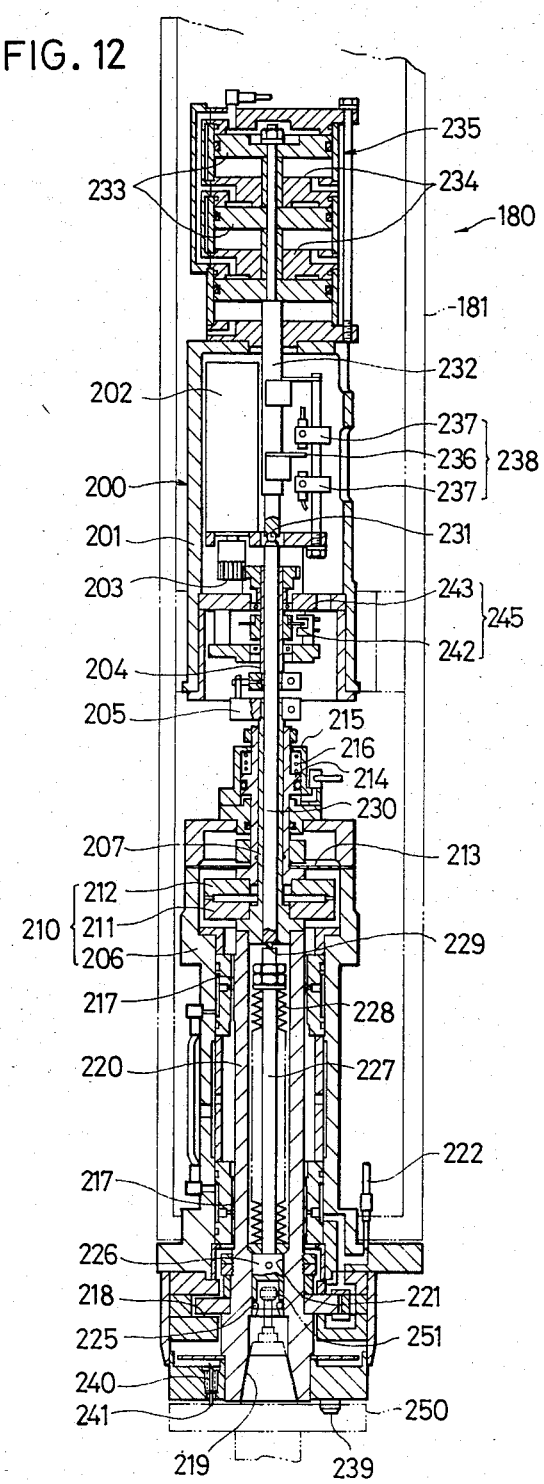
FIG. 12 is an enlarged sectional view showing the probe mounting-removing mechanism.

As shown in FIG. 12, the probe mounting-removing mechanism 200 includes: an indexing motor 202 housed in and supported by an upper case 201 secured to the casing 181; an intermediate sleeve 204 connected to an output shaft of this indexing motor 202 through a gear train 203 and rotatably supported on the upper case 201; a sleeve 207 axially movably and rotation-transmittably connected through a coupling 205 to this intermediate sleeve 204, rotatably supported on a lower case 206 supported on the casing 181 and constituting rotatably driving means in cooperation with the motor 202, the gear train 203, the intermediate sleeve 204 and the coupling 205; a first gear 211 fixed to the bottom end of this sleeve 207 and constituting one of engagement members of a coupling 210 as being multi-angle position engagement means;

a second gear 212 made engageable with this first gear 211 at multi-angle positions and constituting the other engagement member of the coupling 210; a diaphragm 213 as being a rotation locking member for securing this second gear 212 in a manner to be vertically movable and non-rotatable; a gear vertically moving piston 214 solidly secured at the bottom end thereof to this diaphragm 213 and vertically movably coupled onto the periphery of the sleeve 207; a gear vertically moving cylinder 215 slidably receiving therein this gear vertically moving piston 214 and constituting axially driving means in cooperation with the piston 214 fixed to the lower case 206; a spring 216 confined between this gear vertically moving cylinder 215 and the gear vertically moving piston 214, for constantly biasing the second gear 212 fixed through the diaphragm 213 to the bottom end of the gear vertically moving piston 214 toward the first gear 211; a hollow Z spindle 220 fixed at the top end portion thereof to the bottom end of the sleeve 207 to be rotated in unison with the first gear 211, rotatably supported on the lower case 206 through vertically disposed two bearings including a radial air bearing 217 and a thrust air bearing 218, and provided at the bottom end thereof with a tapered hole 219 as being a holder mounting portion capable of receiving one end portion of a probe holder 250; an air piping 222 for supplying compressed air to the upper radial air bearing 217 and the lower thrust air bearing 218, respectively, through passages formed in the lower case 206 and the like; a driving rod 227 axially slidably received in the Z spindle 220 and provided at the bottom end thereof with a ball holder 226 as being probe supporting means having a plurality of balls 225 radially movable and prevented from falling off; a belleville spring 228 as being pull-in means, confined between the top end portion of the driving rod 227 and the Z spindle 220 to bias the ball holder 226 into the Z spindle 220, and causing the balls 225 to project inwardly due to the presence of small-diameter guide holes 221 formed on the Z spindle 220 to thereby engage a pull stud 251 of the probe holder 250; an intermediate shaft 230 brought at the bottom end portion into abutting contact with the top end of the driving shaft 227 through a ball 229 and axially movably received in the sleeve 207; a piston rod 232 brought at the bottom end thereof into abutting contact with the top end of this intermediate shaft 230 through a ball 231 and made vertically movable; an actuator 235 slidably receiving therein a plurality of pistons 233 fixed to the upper end portion of this piston rod 232, housing the respective pistons 233 in compartments partitioned by partition walls 234 to thereby have a plurality of serial multi-stage pressure receiving surfaces, and fixed to the upper case 201; piston rod axial position detecting means 238 having a dog 236 fixed to an intermediate portion of the piston rod 232 and a pair of opposing detectors interposing this dog 236 therebetween and supported on the upper case 201; a projection 239 projecting from the bottom end portion of the Z spindle 220, for positioning the probe holder 250; a pin 241 disappearingly provided on the bottom end portion of the Z spindle 220 similarly to the above, constantly biased in the projecting direction through the resiliency of a spring 240 and havin electric conduction with the probe holder; and a rotary encoder 245 including a rotary disc 242 fixed to the intermediate sleeve 204 and a detector 243 supported by the upper case 201, for detecting an angle of rotation of the intermediate sleeve 204 by the indexing motor 202, and further, an angle of rotation of the first gear 211.

In the probe mounting-removing mechanism 200 with the above-described arrangement, the actuator 235 is operated against the resiliency of the belleville spring 228, the driving rod 227 is lowered, the ball holder 226 is released from the guide hole 221 to make the balls 225 movable radially, and the pull stud 251 of the probe holder 250 is inserted into this ball holder 226. In this state, when the actuator 235 is released from its operation and the driving rod 227 is raised by the belleville spring 228, the pull stud 251 of the probe holder 250 is pulled into the hole 219 of the Z spindle 220 by the ball holder 226, the pull stud 251 can be engaged and held through the action of the guide hole 221 and the balls 225, and the gear vertically moving cylinder 215 is operated in this state of engaging and holding this probe holder 250 or in the state of not holding this probe holder 250 to raise the gear vertically moving piston 214 against the resiliency of the spring 216, whereby the second gear 212 and the first gear 211 of the coupling 210 are disengaged from each other. When the indexing motor 202 is rotated in this state, the first gear 211 is rotated by way of the gear train 203, the intermediate sleeve 204, the coupling 205 and the sleeve 207. When the gear vertically moving cylinder 215 is released from its operation in this state of having rotated through a predetermined angle, the second gear 212 along with the gear vertically moving piston 214 are lowered by the biasing forces of the spring 216 and the diaphragm 213, and the second gear 212 and the first gear 211 are brought into mesh with each other at a position different from the initial position, whereby the angle of engagement between the first and the second gears 211 and 212 is changed. Along with the rotation of the first gear 211, the Z spindle 220 is also rotated through the sleeve 207, whereby the probe holder 250 gripped by the ball holder 226 is rotated, so that the angular position of the probe holder 250 can be changed or the position of the projection 239 fixed to the bottom end of the Z spindle 220 can be changed to change the setting angle of the probe holder 250 to be mounted next time. In this case, the angle of rotation of the first gear 211 is detected by the rotary encoder 245 including the rotary disc 242 fixed to the intermediate portion of the intermediate sleeve 204 and the detector 243 supported by the upper case 201.

Figure 13:
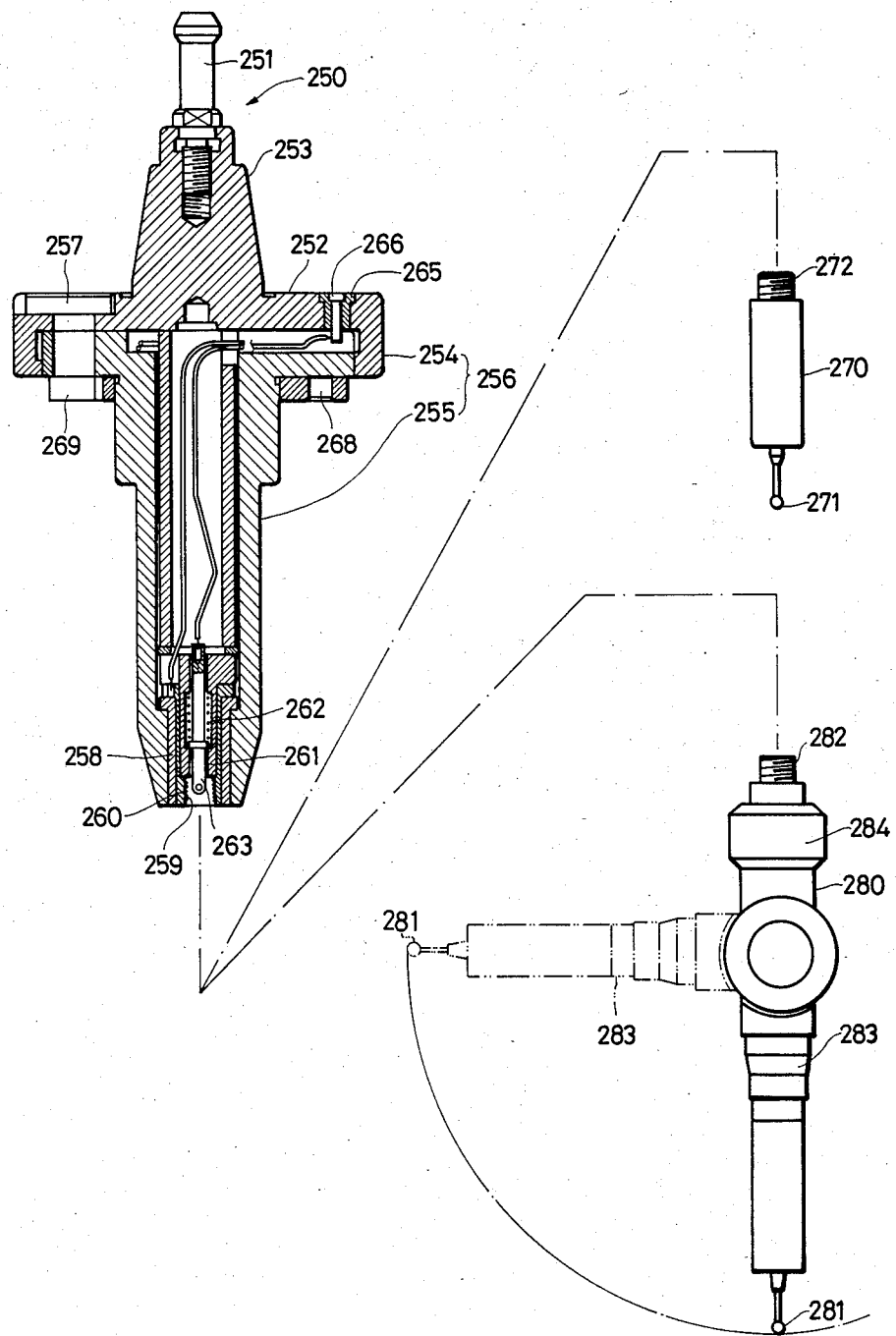
FIG. 13 is an enlarged sectional view showing the probe holder.
Figure 14:
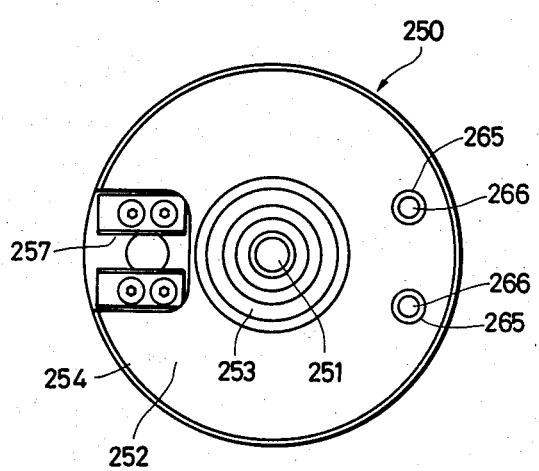
FIG. 14 is a plan view of FIG. 13.
Figure 15:
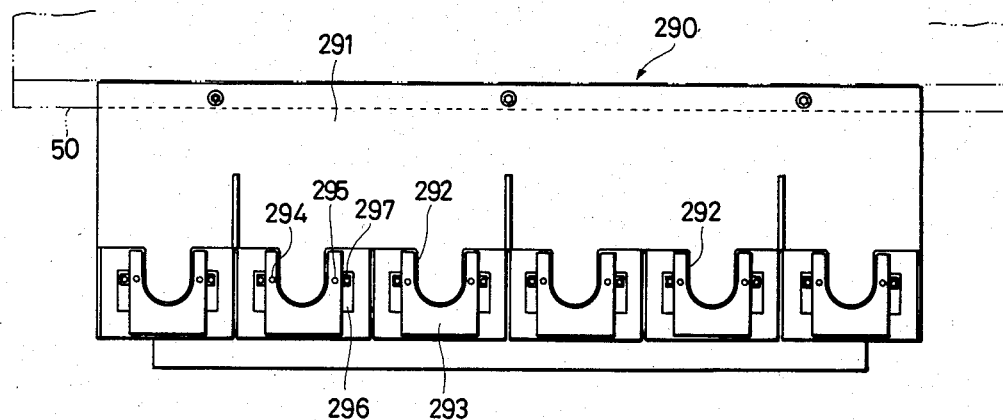
FIG. 15 is an enlarged plan view showing the probe stoker.
Figure 16:
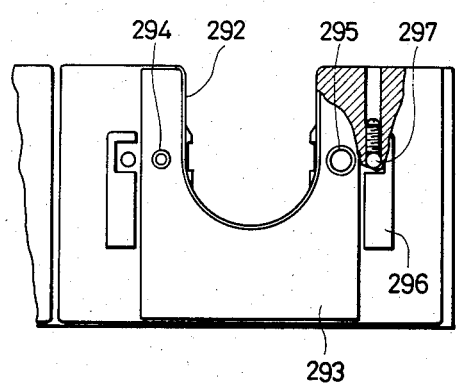
FIG. 16 is an enlarged plan view with the essential portion being partially cutaway showing FIG. 15.
Figure 17:
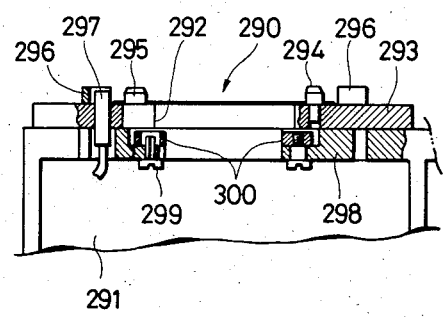
FIG. 17 is a partially cutaway, enlarged front view thereof.
Figure 18:
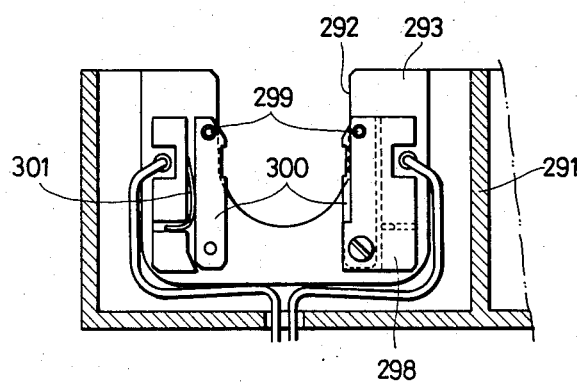
FIG. 18 is an enlarged sectional view in looking FIG. 16 from below.
Figure 19:
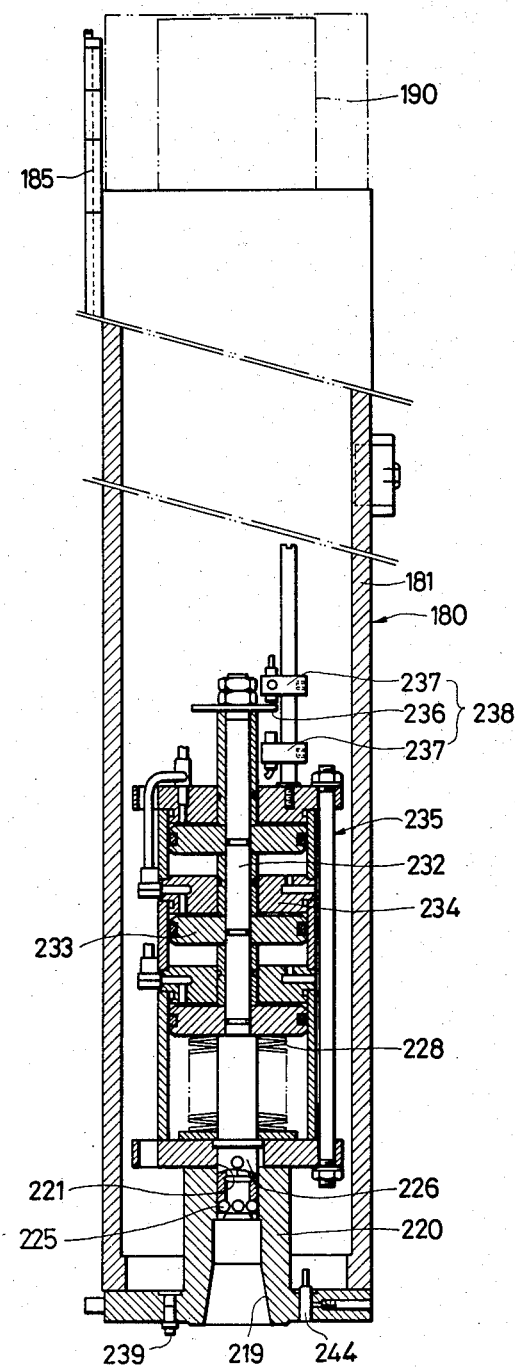
FIG. 19 is an enlarged sectional view showing the probe mounting-removing mechanism in another embodiment of the present invention.

As shown in FIGS. 13 and 14, the probe holder 250 includes: a holder body 256 constituted by an upper member 254 provided at the top end thereof with the pull stud 251, at the bottom end thereof with a flange portion 252 and at the intermediate portion thereof with a tapered surface 253 and a lower member 255 fixed to the undersurface of this upper member 254; a groove-shaped engageable recess 257 formed in the flange portion 252 of the upper member 254, made engageable with a projection 239 provided on the bottom end portion of the probe mounting-removing mechanism 200 and constituting positioning means in cooperation with the projection 239; a conduction sleeve 260 inserted into and fixed to the bottom end portion of the lower member 255 through an insulating sleeve 258 and formed in the lower portion thereof with internal threads 259; a conduction pin 263 axially movably received in this conduction sleeve 260 through an insulating bush 261 and constantly biased by a spring 262 in a projecting direction; a contact pin 266 mounted to the flange portion 252 through an insulating bush 265, obtaining electric conduction by contacting a pin 241 provided on the bottom end portion of the probe mounting-removing mechanism 200 and electrically connected to the conduction pin 263; and a pin hole 268 and an engageable groove 269, which are formed on the undersurface of the flange portion 252. Threadably fastened to the internal threads 259 formed in the lower portion of this probe holder 250 is a touch signal probe 270 or 280, which are signal producing probes different in shape, each of which is provided at the bottom end portion thereof with a measuring element 271 or 281 and at the upper portion thereof with external threads 272 or 282. In this case, the touch signal probe 280 is provided with a rotatable portion 283 having the measuring element 281, and this rotatable portion 283 is made rotatable and fixable at a position rotated relative to a main body 284 having external threads 282.

Referring to FIGS. 1 and 2, a probe stocker 290 is provided on the table 50. As shown in FIGS. 15 to 18, this probe stocker 290 includes: a holding base 291 fixed to one end, i.e. the rear end of the table 50; a plurality of holding plates 293 fixed on the top of the holding base 291, each having a cutaway portion 292 opened toward the other end, i.e. the forward end of the table 50 and spaced a predetermined distance from the table 50; pins 294 and 295 projectingly provided on the top surface of this holding plate 293 at opposite sides of the cutaway portion 292, made engageable with the pin hole 268 and the engageable groove 269, which are formed on the undersurface of the flange portion 252 of the probe holder 250 and constituting probe posture maintaining means in cooperation with the pin hole 268 and the engageable groove 269; a pair of flange mounts 296 provided at positions on opposite sides of the cutaway portion 292 of the holding plate 293 and formed of insulating materials for supporting the undersurface of the flange portion 252 of the probe holder 250; a detector 297 formed of a reed switch or the like and positioned in a cutaway portion of each of the pair of flange mounts 296, for detecting the presence of the probe holder 250; clamp members 300, each of which is rotatably supported at one end thereof by a bracket 298 fixed to each of opposite sides of the cutaway portion on the undersurface of the holding plate 293, made to rock at the other end thereof through a predetermined angle by a rocking control pin 299 provided on the bracket 298 and projecting at the inner surface thereof to the interior of the cutaway portion 292; and a leaf spring 301 confined between the clamp member 300 and the bracket 298, for biasing the clamp member 300 to project toward the interior of the cutaway portion 292. Rested on the holding plate 293 of this probe stocker 290 is the probe holder 250 adjusted in its position. In this case, the respective probe holders 250 are prevented from falling off the holding plates 293 through the agency of the clamp members 300 biased by the leaf springs 301.

Referring to FIG. 1, designated at 310 is a control device having a display section 311, schematically shown through, peripheral components such as a printer, a cathode ray tube and the like, not shown, and further, incorporating therein a computer system having calculating function, storage function and the like, for controlling operations of the respective sections in accordance with a predetermined program, 320 a work to be measured as rested on the table 50, 26 a bellows cover for dusting the Y-axis direction driving mechanism 60, and 27 a side cover. Furthermore, the probe mounting-removing mechanism 200 and the probe stocker 290 constitute an automatic probe mounting-removing device.

Description will hereunder be given of action of this embodiment. The probe holder 250 secured thereto with the touch signal probe 270 or 280 being of a predetermined shape is set on the holding plate 293 of the probe stocker 290 fixed to the top surface of the table 50, and a work 320 is rested on and fixed to the top surface of the table 50. In this state, when a predetermined command is delivered from the control device 310, the motor 62 of the Y-axis direction driving mechanism 60 is driven in response to this command, whereby the table 50 is moved forwardly to the left in FIG. 1 through the feed screw shaft 64 and the like, so that the probe stocker 290 is positioned directly beneath the Z-axis structure 180. On the other hand, along with the driving of the Y-axis direction driving mechanism 120 is driven, whereby the slider 110 is moved in the direction of X-axis, so that the Z-axis structure 180 can be moved to stopped at a position directly above a predetermined probe holder 250 rested on the probe stocker 290.

In this state, the motor 141 of the Z-axis direction driving mechanism 140 in the slider 110 is operated to lower the Z-axis structure 180, whereby the probe holder 250 is received in the hole 219 as being the probe mounting portion of the Z spindle 220 housed in the Z-axis structure 180. The actuator 235 is operated to push down the driving rod 227 against the resiliency of the belleville spring 228, whereby the ball holder 226 is dislodged from the guide rail 221 and balls 225 are in free conditions, so that the pull stud 251 disposed at the top end of the probe holder 250 can be readily inserted into the ball holder 226.

Subsequently, when the actuator 235 is released from its operation, the driving rod 227 is raised through the resiliency of the belleville spring 228, whereby the pull stud 251 is pulled in by the ball holder 226, the tapered surface 253 of the probe holder 250 is engaged with the hole 219, the projection 239 formed at the bottom end portion of the probe mounting-removing mechanism 200 is inserted into the engageable recess 257 of the probe holder 250, and further, the contact pin 266 of the probe holder 250 comes into contact with the pin 241 of the probe mounting-removing mechanism 200, so that an electric conduction can be established.

To change the position of the measuring element 281 of the touch signal probe 280 in the state where the probe holder 250 is held by the probe mounting-removing mechanism 200 of the Z-axis structure 180 as described above, such steps can be taken that the gear vertically moving cylinder 215 of the probe mounting-removing mechanism 200 is operated to raise the gear vertically moving piston 214 against the resiliency of the spring 216, the first and the second gears 211 and 212 are disengaged from each other, and, in this state, the indexing motor 202 is driven to rotate the first gear 211 through a predetermined angle by way of the gear train 203 and the intermediate sleeve 204.

Mounting of the probe holder 250 to the probe mounting-removing mechanism 200 is made and the angle of setting is adjusted as described above, thereafter, the Y-axis direction driving mechanism 60, the X-axis direction driving mechanism 120 and the Z-axis direction driving mechanism 140 are driven in response to a command from the control device 310, the measuring element 281 of the touch signal probe 280 mounted to the bottom end of the Z-axis structure 180 is caused to contact a predetermined position of the work 320, the positions of the measuring instrument 281 in the directions of X-, Y- and Z-axes at the time of contact are stored by the control device 310, and, measuring of contact points of this measuring element 281 with the work 320 are successively carried out, thus completing the measurement of the work 320. When replacement of the touch signal probe 280 is required in measuring this work 320, the Z-axis structure 180 is positioned above the probe stocker 290 as aforesaid, a predetermined probe holder 250 rested on the probe stocker 290 is mounted to the Z-axis structure 180. In this case, the probe holder 250, which has been used, is returned to a vacant position out of the cutaway portions 292 of the probe stocker 290. However, the returning works should be carried out such that the Z-axis structure 180 is located at the vacant position of the cutaway portions 292, thereafter, the actuator 235 is operated to lower the driving rod 227 against the resiliency of the belleville spring 228, gripping of the pull stud 251 by the ball holder 226 is released, and the Z-axis structure 180 in the opened state is raised.

The above-described embodiment can offer the following advantages.

More specifically, in this embodiment, the table 50 is made movable, so that the supports 90 and the like, which are heavy in weight, are not needed to move, the driving mechanism, i.e. the Y-axis direction driving mechanism 60 may require a power of small value, and the stopping position of the table 50 may be accurate because of an inertia of low value. Since the table 50 is guided by two parallel surfaces including the first guide member 11 as being an X-axis direction movement control member provided on the bedplate 10 and the second guide member 12 as being a Z-axis direction movement control member, respectively, both the two directions can be adjusted independently of each other as different from the case of the conventional V-shaped guide groove, so that the guiding accuracy for the table 50 can be improved. Furthermore, in the first guide member 11, the straightness of the parallel guide surface 18 can be regulated by the straightening means 40, so that the guiding accuracy can be improved from this respect as well. Additionally, the first guide member 11 and the second guide member 12 are formed separately of the bedplate 10, so that, in working on the guide surfaces, the surfaces can be finished relatively easily and with high accuracy. Furthermore, the Z-axis structure 180 is provided therein with the probe mounting-removing mechanism 200, the table 50 is provided thereon with the probe stocker 290 and the table 50 is made movable, so that the function of automatically replacing the touch signal probes 270 and 280 with each other can be easily achieved. Additionally, the plurality of touch signal probes are prepared on the probe stocker 290 as adjusted in their postures, the works of replacing the touch signal probes 270 and 280 with each other can be carried out for a time duration substantially equal to the time duration required for the measuring operation of one point by the touch signal probe 270 or 280, so that the measuring operation, while the touch signal probes 270 and 280 are replaced with each other, can be very quickly carried out. In this case, every time the replacement between the touch signal probes 270 and 280 is made, the touch signal probe 270 or 280 may be brought into contact with the origin position, not shown, to carry out the origin check. If the origin check is made as described above every time the replacement is made, then the measuring accuracy can be further improved. Furthermore, connecting construction between the bedplate 10 formed of the stone-like material, the beam 100 and the support posts 90 is made by the bolts 25 and 104 inserted through the through-holes 24 and 103 formed in the fastening fixtures 23 and 102 inserted into the holes 22 and 101, so that reliable fixing can be attained by the simplified arrangement. Furthermore, in the X-axis direction driving mechanism 120 for moving the slider 110 in the direction of X-axis, rotation locking of the nut member 129 threadably coupled to the feed screw shaft 124 is performed by the guide rail 105 provided on the beam 100 as being the fixed portion through the connector 134 and the rollers 135, so that such a disadvantage can be obviated that the slider 110 is deformed in the twisting direction to deteriorate the accuracy, as compared with the conventional construction in which rotation locking is performed by the slider 110 itself. Furthermore, importing of the movement of the nut member 129 to the slider 110 is performed through the connecting plate 130 fixed to the nut member 129, the thrust bearings 131 movable in the radial direction of the feed screw shaft 124 on this connecting plate 130, the set-screws 132 and the bracket 133, whereby all of the adverse influence on the measuring accuracy due to the radial reflection, eccentricity and the like of the feed screw shaft 124 can be absorbed by the radial movements of the connecting plate 130 and of the thrust bearings 131, so that the adverse influence on the slider 110 can be avoided. Furthermore, the air balance mechanism 190 is provided in the Z-axis structure 180, whereby the driving operational force of the Z-axis structure 180 can be minimized, so that the motor 141 for driving this Z-axis structure 180 can be rendered compact in size, with the result that the slider 110 can be rendered compact in size and light in weight. Additionally, the adverse influence due to the eccentricity and the like of the feed screw shaft 145 in the Z-axis direction driving mechanism 140 can be absorbed through the agency of the connecting plate 149 and the thrust bearings 150 similarly to the case of the X-axis direction driving mechanism 120, so that the adverse influence on the measuring accuracy can be avoided. In order to drive the Z-axis structure 180 at high speed, the lead of the feed screw shaft 145 is required to be 4 mm or more for example. However, when the lead as large as this is adopted, if the air for air balancing in the air balance mechanism 190 is lost from some reason or other, then there is a possibility that the feed screw shaft 145 is rotated by the gravity of the Z-axis structure 180 form the side of the nut member 146 and the Z-axis structure 180 is subjected to gravity-drop. However, in this embodiment, the provision of the lock device 160 makes it possible to strongly clamp the disc 161 fixed to the top end of the feed screw shaft 145 by the spring 165 of the lock device 160 through the rocking members 163 and the bolts 164 when the compressed air is lost, so that, when the air is lost, rotation of the feed screw shaft 145 in the reverse direction can be effectively prevented and damages of the portions due to the drop of the Z-axis structure 180 can be avoided. Furthermore, the driving source of the driving rod 227 in the probe mounting-removing mechanism 200 is the actuator 235 having the plurality of pressure receiving surfaces, so that, even if the belleville spring 228 holding the probe holder 250 is turned into a powerful spring by use of compressed air being relatively low in pressure and utilized in the general factories, the resiliency of the belleville spring 228 can be satisfactorily overcome to drive the driving rod 227, and the probe holder 250 can be reliably mounted. Furthermore, with the probe mounting-removing mechanism 200, the provision of the indexing motor 202, the coupling 210 and the gear vertically moving cylinder 215 makes it possible to index the Z spindle, so that the direction of the touch signal probe 280 secured to the probe holder 250 can be adjusted with high accuracy and reliably. The intermediate sleeve 204 of the probe mounting-removing mechanism 200 and the sleeve 207 are connected to each other through the axially movable coupling 205, whereby the influence of the axial movement of the sleeve 207 along with the elevation of the second gear of the coupling 210 is not exerted on the rotary encoder 245 provided on the side of the intermediate sleeve 204, so that the rotary encoder 245 is not lowered in the accuracy thereof. The Z spindle 220 and the probe holder 250 are positioned by the projection 239 and the engageable recess 257, so that the positions to be mounted to the Z spindle 220 can be accurately set. When the probe holder 250 is installed on the probe stocker 290, positioning is made between the pin hole 268, engageable groove 269 and the pin 294, 295, the position of installation can be accurately obtained. The clamp means including the pair of clamp members 300 is provided on the probe stocker 290, whereby such a possibility can be eliminated that the probe holders 250 are dropped from the probe stocker 290 by the inertial force due to the movement and the like of the table 50, so that an unexpected accident can be avoided in advance. The probe stocker 290 is provided with the detector 297, whereby an immediate judgment can be made as to whether the probe holder 250 is rested or not, so that the cutaway portion 292 can be readily detected when the probe holder 250, which has been used, is returned. Further, the bedplate 10 and the beam 100 are formed of the stone-like materials, so that deteriorated accuracy due to the change with time can be effectively prevented. Connection between the bedplate 10 and the first guide member 11 or the second guide member 12 is made such that the bolt 16 penetrating through the first guide member 11 or the second guide member 12 is fixed to the fixture 14 bonded and fixed into the blind hole 13 formed in the bedplate 10, so that the fixing can be easily and reliably performed. Prevention of the Z-axis structure 180 from dropping when the compressed air is lost is made such that the Z-axis structure 180 itself is not stopped in its movement, but the feed screw shaft 145 is stopped in its movement, so that locking can be effected under a force of a small value and the lock device 160 can be simplified in construction.

FIGS. 19 to 22 show another embodiment of the present invention. In this embodiment, the Z spindle 220 of the Z-axis structure 180 is made non-rotatable. In this embodiment, the constituent portions identical with or corresponding to those shown in the preceding embodiment are depicted by the same reference numerals as the latter to simplify the description.

Referring to these drawings, the air balance mechanism 190 is provided in the upper portion of the casing 181 of the Z-axis structure 180 and the Z spindle 220 is fixed to the lower portion of the casing 181. This Z spindle 220 has a tapered hole 219 as being the probe mounting portion and incorporates therein the ball holder 226 as being the probe supporting means in a manner to be axially movable. This ball holder 226 is vertically movable by the position rod 232. This piston rod 232 is received in the actuator 235 having a partition wall 234 and, under the operation of the actuator 235, can push the ball holder 226 from the small diameter guide hole 221 against the resiliency of the belleville spring 228, to release the chuck of the probe holder 250. Movement of this piston rod 232 can be detected by an axial position detecting means 238 including the dog 236 and the pair of detecting portions 237.

Figure 20:
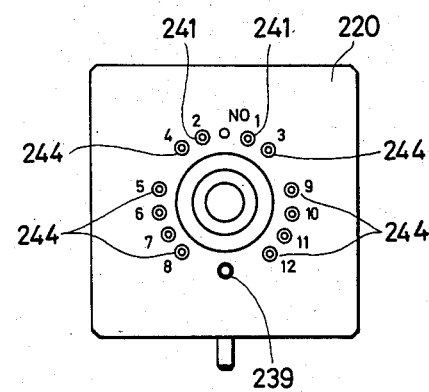
FIG. 20 is a bottom view thereof.
Figure 21:
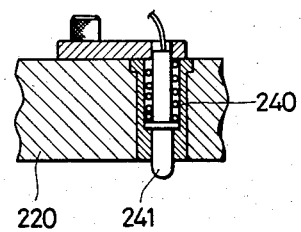
FIGS. 21 and 22 are enlarged sectional views showing the essential portions in FIG. 20.
Figure 22:
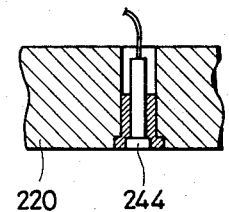

The spindle 220 is provided on the undersurface thereof with the projection 239 and contact points of two types. More specifically, as shown in FIG. 21, the contact points at positions No. 1 and No. 2 in FIG. 20 are the pins 241 insulated from the Z spindle 220, made disappearable and biased by the spring 240. On the other hand, the contact points at positions No. 3 to No. 12 in FIG. 20 are the fixed pins 244 insulated from the Z spindle 220 and fixed.

Even with the above-described arrangement, replacement of the probe holders 250 can be performed in the same manner as in the above embodiment, except that the probe holder 250 cannot be rotated. However, in the case where there is no measurement through the rotation in particular, the construction of the measuring instrument can be simplified and lowered in the production cost accordingly, so that this embodiment is advantageous.

Figure 23:
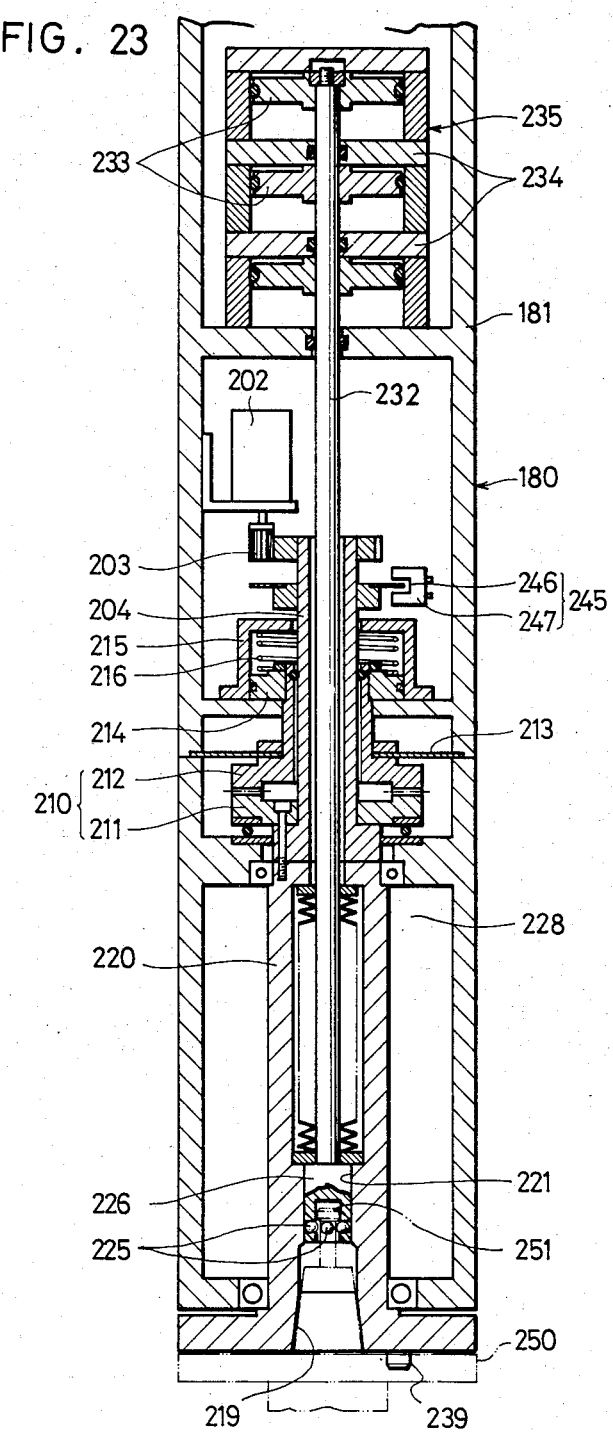
FIG. 23 is an enlarged sectional view showing the probe mounting-removing mechanism in a further embodiment of the present invention.

FIG. 23 shows a further embodiment of the present invention. In this embodiment, the Z spindle 220 is not supported by the air bearing, but by the ordinary ball bearing, moreover, the driving rod 227 is dispensed with, the piston rod 232 is made to function as the driving rod 227, and further, the axial position detecting means 238 provided along the piston rod 232 is dispensed with. The intermediate sleeve 204 is dispensed with, the sleeve 207 is made to function as the intermediate sleeve 204, and other respects are substantially identical with those in the preceding embodiments except for the differences in shape and the like.

Even with the above-described arrangement, replacement of the probe holders 250 can be advantageously performed in the same manner as in the preceding embodiments.

Figure 24:
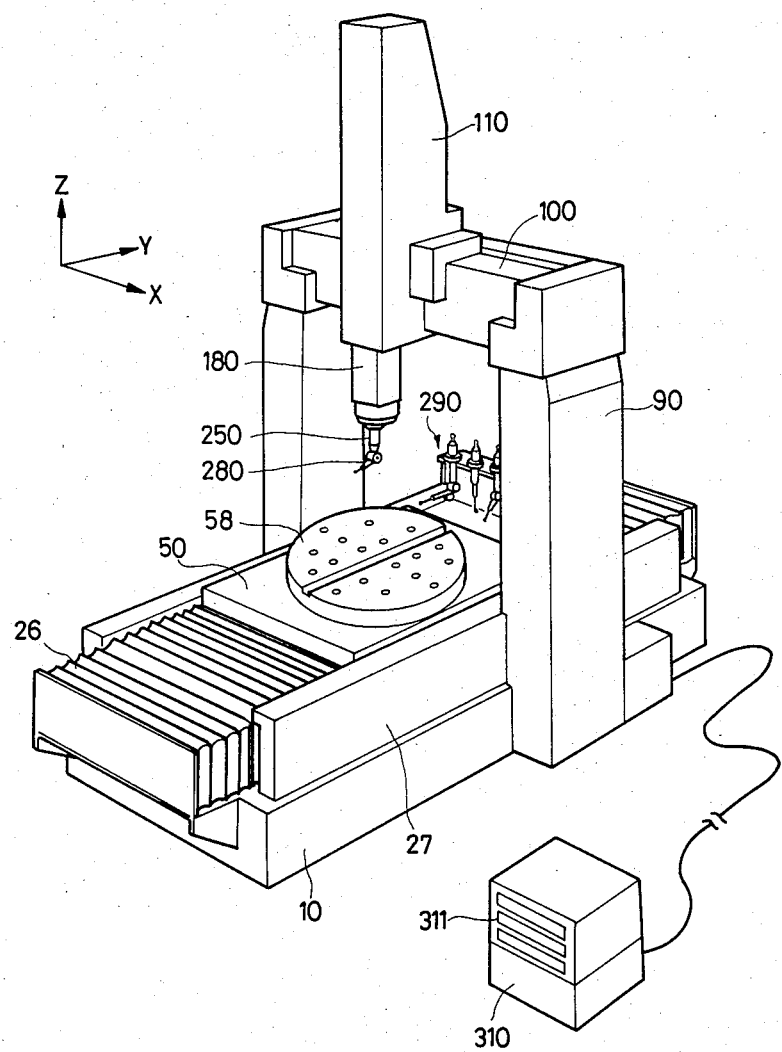
FIG. 24 is a perspective view showing the general arrangement in a still further embodiment of the present invention.

FIG. 24 shows a still further embodiment of the present invention, wherein an automatically rotatable rotary table 58 driven by an ordinary rotatably driving mechanism, not shown, is provided on the table 50. Other respects in the arrangement are identical with the embodiment shown in FIG. 1. With this arrangement, automating of the measurement can be achieved more satisfactorily.

Additionally, in working the present invention, the supporting portion of the pull stud 251 in the probe mounting-removing mechanism 200, i.e. the ball holder 226 need not necessarily be limited to the above-described construction, and one supporting by an electromagnet or supporting by a collet chuck may be adopted. Furthermore, the method of supporting the pull stud 251 in the probe mounting-removing mechanism 200 need not necessarily be limited to the method in which the pull stud 251 is constantly supported as in the above embodiment, and the method, in which, upon completion of retraction, the pull stud 251 is held by the tapered surface 253 of the probe holder 250 and the tapered hole 219 of the Z spindle 220, may be adopted. Further, the motors 62, 122 and 141 of the X-axis, Y-axis and Z-axis direction driving mechanisms 60, 120 and 160 include not only an alternating current, a direct current and pulse electric motors but also an air motor, a hydraulic motor and the like. Furthermore, out of the three axes perpendicularly intersecting one another, including the X-, Y- and Z-axes, the Z-axis need not necessarily be limited to the vertical one, and the X-axis may be vertical. In this case, the Z spindle 220 should be disposed horizontally. Further, description has been given of the example where the touch signal probe is adopted as the signal producing probe according to the present invention, however, the mode of detecting the signal need not necessarily be limited to the touch signal, and photoelectric detection or non-contact type detection may be applied. Furthermore, the touch signal probe need not necessarily be limited to the touch signal probe 270 or 280 itself, and is a concept including ones mounted to the probe holders 250. Additionally, when the nut member 64 and the bracket 65 in the Y-axis direction driving mechanism 60, the connection has been fixedly performed in the preceding embodiments, however, the present invention need not necessarily be limited to this, and such a construction may be adopted that the Y-axis direction driving mechanism 60 permits the movement only in the radial direction similarly to the X-axis or Z-axis direction driving mechanism 120 or 140.

As has been described hereinabove, the present invention can offer the advantage of providing the coordinate measuring instrument wherein, in operating the mounting or removing of the signal producing probe, and operating the change in direction of the measuring element in the coordinate measuring instrument, the operating efficiency can be improved.

USABILITY IN INDUSTRIES

The present invention can be utilized when the work is tridimentionally measured, and particularly, utilized in the measurement in which the signal producing probes are replaced with each other so that the probe can suit to the configuration of measuring of the work.

We claim:

1. A coordinate measuring instrument wherein a work to be measured, which is mounted on the top surface of a table and a signal producing probe are moved in tridimensional directions relative to each other to directly or indirectly relate the both to each other, and the dimensions and configuration of said work are measured from relative displacement values between the both, characterized in that said measuring instrument comprises:
    a table supported on a bedplate in a manner to be movable at least in the direction of Y-axis when the Y-axis is an axis incorporated in the horizontal plane out of three axes perpendicularly intersecting one another, including the X-, Y- and Z-axes;
    a probe stocker fixed to said table, for erectingly holding a plurality of probe holders having signal producing probes different from one another;
    a Z-axis structure provided on a beam member laterally racked in parallel to the top surface of said table and supported in a manner to be slidable in the direction of Z-axis; and
    a probe mounting-removing mechanism provided on said Z-axis structure and capable of mounting said signal producing probe thereto or removing same therefrom; whereby one signal producing probe selected from said plurality of signal producing probes held by said probe stocker can be automatically replaced and installed on said Z-axis structure.

2. A coordinate measuring instrument as set forth in cliam 1, wherein said probe stocker has a plurality of probe holding cutaway portions opened toward one side in the direction of Y-axis and said probe holder is engageable with the peripheral edge of said cutaway portions.

3. A coordinate measuring instrument as set forth in claim 1, wherein said probe stocker comprises:
    a holding base fixed to one end of said table;
    a holding plate spaced a predetermined distance apart from said holding base and having cutaway portion opened toward the other end of said table; and posture maintaining means for engaging said probe holder with a predetermined position in said cutaway portion.

4. A coordinate measuring instrument as set forth in claim 1, wherein said probe stocker includes a detector for detecting the presence of said probe holder being rested thereon.

5. A coordinate measuring instrument as set forth in claim 1, wherein said Z-axis structure is mounted to said beam member through a slider movable in the direction of X-axis.

6. A coordinate measuring instrument as set forth in claim 1, wherein said probe mounting-removing mechanism comprises:
a hollow Z spindle formed with a portion for mounting said probe holder; and
a driving rod axially slidably received in said Z spindle and having probe supporting means radially movable.

7. A coordinate measuring instrument as set forth in claim 6, wherein said probe supporting means is a ball holder having plurality of balls.

8. A coordinate measuring instrument as set forth in claim 7, wherein, when said driving rod is pulled into said Z spindle, balls of said ball holder are partially projected into a hollow portion of said ball holder due to the presence of small diameter guide holes formed on the inner surface of said Z spindle to clamp a shaft portion of a touch signal probe positioned in the hollow portion, while, when said driving rod is pushed outwardly from the Z spindle, the balls are positioned in large-diameter holes of the Z spindle to be freely movable.

9. A coordinate measuring instrument as set forth in claim 6, wherein said driving rod is constantly biased in one axial direction by a spring and said driving rod is forcedly displaceable in the other axial direction against the biasing force of said spring by an actuator.

10. A coordinate measuring instrument as set forth in claim 9, wherein the biasing direction of said spring is a direction in which a touch signal probe is pulled into said Z spindle.

11. A coordinate measuring instrument as set forth in claim 9, wherein said actuator has a plurality of pressure receiving surfaces serially fixed in the axial direction of said driving rod and working air is simultaneously supplied to the respective pressure receiving surfaces.

12. A coordinate measuring instrument as set forth in claim 1, wherein said probe mounting-removing mechanism includes means for detecting as to whether said probe holder is mounted to a mounting portion of said Z spindle or not.

13. A coordinate measuring instrument as set forth in claim 1, wherein said table is rotatable.

14. A coordinate measuring instrument, comprising:
a table supported on a bedplate in a manner to be movable at least in the direction of Y-axis when the Y-axis is an axis incorporated in the horizontal plane out of three axes perpendicularly intersecting one another, including the X-, Y- and Z-axes;
a probe stocker fixed to one end in the direction of Y-axis of said table, for holding a plurality of probe holders having signal producing probes different from one anther;
a Z-axis structure supported by a slider supported, in a manner to be movable in the direction of X-axis, on a beam member laterally racked across a pair of supports fixed to said bedplate, and slidable in the direction of Z-axis;
a probe mounting-removing mechanism provided on said Z-axis structure and having a Z spindle capable of mounting said probe holder thereto or removing same therefrom; and
an angularly positioning mechanism for rotatably displacing a direction of a measuring element of said signal generating probe.

15. A coordinate measuring instrument as set forth in claim 14, wherein said angularly positioning mechanism comprises:
a rotation locking member mounted to said Z-axis structure in a manner to be axially displaceable and non-rotatable;
multi-angle position engagement means having a pair of engagement members meshingly engageable with each other at multi-angle positions in the circumferential direction, with one engagement member being mounted on said Z spindle and the other on a rotation locking member;
biasing means for biasing said pair of engagement members of the multi-angle position engagement means in the direction of constantly meshing;
axial direction driving means for overcoming said biasing means to release the other of the engagement members from the engagement with one of the engagement members; and
rotatably driving means for rotating one of the engagement members together with the Z spindle through a predetermined angle in the disengaged state of the pair of engagement members by said axial direction driving means, to thereby change the meshing angle position of the pair of engagement members.

16. A coordinate measuring instrument as set forth in claim 15, wherein said engagement members include a first and a second gear, and said second gear may be in mesh with said first gear at multi-angle positions, and is vertically movable and non-rotatable.

17. A coordinate measuring instrument as set forth in claim 16, wherein said angularly positioning means includes a rotary encoder for detecting an angle of rotation of said first gear.

18. A coordinate measuring instrument, comprising:
a table supported on a bedplate in a manner to be movable at least in the direction of Y-axis when the Y-axis is an axis incorporated in the horizontal plane out of three axes perpendicularly intersecting one another, including the X-, Y- and Z-axes;
a probe stocker including a holding base fixed to one end in the direction of Y-axis of said table, holding plates for resting thereon a plurality of probe holdes having signal generating probes different from one another, said holding plates being spaced a predetermined distance apart from said holding base and having a plurality of cutaway portions opened toward the other end of said table, pins projected from each of said holding plates, for being engaged with said probe holder to hold same at a predetermined position, a detector for detecting the presence of said probe holder being rested on the cutaway portion, and clamp members provided on said holding plate, for clamping said probe holder;
a pair of supports fixed to said bedplate and a slider supported by a beam member in a manner to be movable along said beam member laterally racked across said supports in the direction of X-axis; and a Z-axis structure supported by said slider, movable in the direction of Z-axis and provided with a probe mounting-removing mechanism; wherein said probe mounting-removing mechanism includes:

a hollow Z spindle formed with a portion for mounting said probe holder;

a driving rod provided with probe supporting means axially movably received in said Z spindle, for performing the mounting and the removing of the probe holder by said axial movement;

an actuator having serially arranged pressure receiving surfaces, for moving said driving rod in the axial direction;

driving means for rotatably driving said Z spindle;

a first gear rotatable in unison with said Z spindle by the driving of said driving means;

a second gear engageable with said first gear at multi-angle positions vertically movable and nonrotatable through a diaphragm;

a spring for constantly biasing said gears in the direction of engagement; and axial direction driving means including a cylinder and a piston, for releasing the engaged state of said second gear with said first gear.

* * * * *